(12) United States Patent
Hollander

(10) Patent No.: US 7,672,119 B2
(45) Date of Patent: Mar. 2, 2010

(54) FOLDING USER INTERFACE

(76) Inventor: Jonathan Marc Hollander, 73 Summer St., #301, San Francisco, CA (US) 94103

( * ) Notice: Subject to any disclaimer, the term of this patent is extended or adjusted under 35 U.S.C. 154(b) by 8 days.

(21) Appl. No.: 12/004,083

(22) Filed: Dec. 18, 2007

(65) Prior Publication Data

US 2008/0212272 A1    Sep. 4, 2008

Related U.S. Application Data

(60) Provisional application No. 60/870,474, filed on Dec. 18, 2006.

(51) Int. Cl.
*H05K 7/16* (2006.01)
(52) U.S. Cl. .................. 361/679.16; 361/679.08; 361/679.15; 345/168; 341/22; 400/472
(58) Field of Classification Search ............ 361/679.08, 361/679.16, 679.15; 400/472; 345/168; 341/22
See application file for complete search history.

(56) References Cited

U.S. PATENT DOCUMENTS 5,949,643 A * 9/1999 Batio ................... 361/679.27
6,266,234 B1 * 7/2001 Leman ................. 361/679.11
7,003,266 B2 * 2/2006 Bestle ...................... 455/90.3
7,446,757 B2 * 11/2008 Mochizuki et al. .......... 345/168
2005/0017953 A1 * 1/2005 Pekka ........................ 345/169

* cited by examiner

*Primary Examiner*—Jayprakash N Gandhi
*Assistant Examiner*—Ingrid Wright
(74) *Attorney, Agent, or Firm*—Law Office of Jonathan Hollander PC

(57) ABSTRACT

An electronic device interface provides three different physical user interfaces. Users may fold or unfold the device to reveal one interface and hide the other two. A first module includes a first portion of a first interface. A second module includes a first portion of a second interface. A third module includes a second portions of the first and second interfaces. The second and third modules are folded together to hide the second interface and expose the first interface. The first and third modules are folded together to hide the first interface and expose the second interface. The third interface is exposed when the first and third modules and the second and third modules are folded together, hiding the first and second interfaces. The first modules can include a concave portion matching a convex portion of the third module to maintain a flush profile for the first and second interfaces.

29 Claims, 19 Drawing Sheets

THIRD
INTERFACE
150
FRONT VIEW

THIRD
INTERFACE
REAR VIEW 175

MODULE A 300
SIDE VIEW 350

355

355

MODULE A 300
BOTTOM VIEW
375

MODULE B 400
SIDE VIEW 450

455

455

MODULE B 400
BOTTOM VIEW
475

MODULE C 500
FRONT VIEW
505

RIGHT PORTION OF FIRST INTERFACE 507

MODULE C 500
REAR VIEW

RIGHT PORTION OF SECOND INTERFACE 527

MODULE C 500
SIDE VIEW 550

MODULE C 500
BOTTOM VIEW
575

FOLDING USER INTERFACE

CROSS-REFERENCE TO RELATED APPLICATIONS

This application claims priority to U.S. Provisional Patent Application No. 60/870,474, filed Dec. 18, 2007, and entitled "Folding User Interface," which is incorporated by reference herein for all purposes.

BACKGROUND OF THE INVENTION

The present invention relates to the field of user interfaces for portable and handheld electronic devices. Many portable and handheld electronic devices include components such as display devices, audio input and output devices, cameras, volatile and non-volatile storage, microprocessors, and/or wired, wireless, or cellular network interfaces. As such, many of these devices may be potentially capable of a wide variety of functions, including displaying images and video; playing games; playing music; recording images or video; sending and receiving text messages, e-mail, and instant messages; initiating and receiving telephone calls; videoconferencing; and browsing web sites; and running business or other types of application software.

Despite the capabilities of the components of handheld and portable electronic devices, may users prefer devices that perform only one or two primary functions. For example, users may have a handheld music player to listen to digital audio files, a cellular telephone to make telephone calls; and a wireless e-mail device for exchanging e-mails. One reason for this is that most handheld and portable electronic devices do not provide a simple and intuitive user interface for multiple disparate functions. For example, many users prefer a thumb-size QWERTY keyboard for exchanging e-mails, a touch sensitive scroll-wheel, touchpad, or slide to access digital music and videos, and a directional-pad or joystick for playing games. Because of the small size of handheld and portable electronic devices, it is difficult to include all of these different types of interfaces on the surface of the device. Moreover, even if these different interfaces are included, the result is often a cluttered, confusing interface of limited utility.

One prior approach uses a touch screen for a user interface. The touch screen can be configured to display images of one or more virtual user interfaces and can detect user interactions with each virtual interface. Although the touch screen allows for a wide variety of different virtual interfaces, the quality of the user experience is often poor. Touch screens do not provide any tactile feedback to users. This substantially degrades the quality of the user experience because users cannot distinguish virtual user interface elements by touch and must look at the touch screen to interact with the virtual interface. Moreover, the responsiveness of touch screens is slow and fingerprints tend to mar the appearance of the touch screen.

It is therefore desirable for a device to include multiple separate physical interfaces dedicated to different tasks. It is also desirable for the device to integrate multiple separate physical interfaces in a small form factor. It is further desirable for the device to enable users to access different interfaces in an intuitive manner.

BRIEF DESCRIPTION OF THE DRAWINGS

The invention will be described with reference to the drawings, in which.

In the drawings, the use of identical reference numbers indicates identical components.

BRIEF SUMMARY OF THE INVENTION

An embodiment of the invention includes an interface of an electronic device having a double hinged case to provide three different physical user interfaces. Users may fold or unfold the device to reveal one interface and hide the other two. A first module includes a first portion of a first user interface a first surface. A second module includes a first portion of a second user interface on a second surface. A third module includes a second portion of the first interface on a third surface and a second portion of the second interface on a fourth surface. In an embodiment, the third and fourth surfaces on the third module face opposite directions.

In an embodiment, the first module is connected with the third module via a first folding joint, such as a hinge or pivot. The first module and the third module are connected such that the first and third surfaces are aligned. Similarly, the second module is connected with the third module via a second folding joint. The second module and the third module are connected such that the second and fourth surfaces are aligned. The folding joints allow the first and third surfaces to face the same or the opposite direction and the second and fourth surfaces to face the same or the opposite direction.

In an embodiment, the second and third modules are folded together to hide the second interface when the first interface is exposed. Similarly, the first and third modules are folded together to hide the first interface when the second interface is exposed. In still a further embodiment, a latching mechanism holds the first and third modules together when the second interface is exposed and holds the second and third modules together when the first interface is exposed.

In a further embodiment, the first surface can include a concave portion matching a convex portion of the third module. This allows the modules to maintain a flush rear profile for both the first and second user interfaces.

In an embodiment, a first portion of a third interface is located on a fifth surface on the first module and a second portion of the third interface is located on a sixth surface on the second module. The third interface is exposed and active when both the first and third modules and the second and third modules are folded together, hiding the first and second interfaces.

DETAILED DESCRIPTION

Figure 1A:
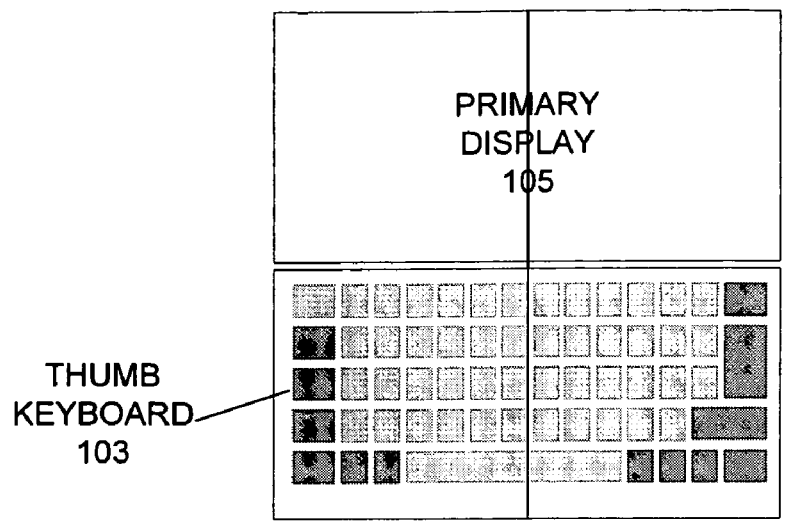
FIGS. 1A-1D illustrate example user interfaces presented by an example embodiment of the invention.

An embodiment of the invention includes three alternate user interfaces. A user can fold and unfold the device to reveal one user interface and hide the other user interfaces. FIGS. 1A-1D illustrate example user interfaces presented by an example embodiment of the invention. FIG. 1A illustrates a first user interface 100 of an example device. The first user interface 100 includes a thumb keyboard 103 adapted for text entry and a primary display 105. Being adapted for text entry, the first user interface 100 is well suited for text messaging, instant messaging and online chat applications, e-mail, and word processing, data entry, and other office productivity applications.

The primary display 105 can use LED, LCD, OLED, gas plasma, e-ink, or any other type of display technology known in the art to display color or monochrome still images, text, and animation or video. As discussed in more detail below, in an embodiment of the device, the primary display 105 is comprised of two smaller display devices arranged next to each other to allow the device to be folded along the center line.

Figure 1B:
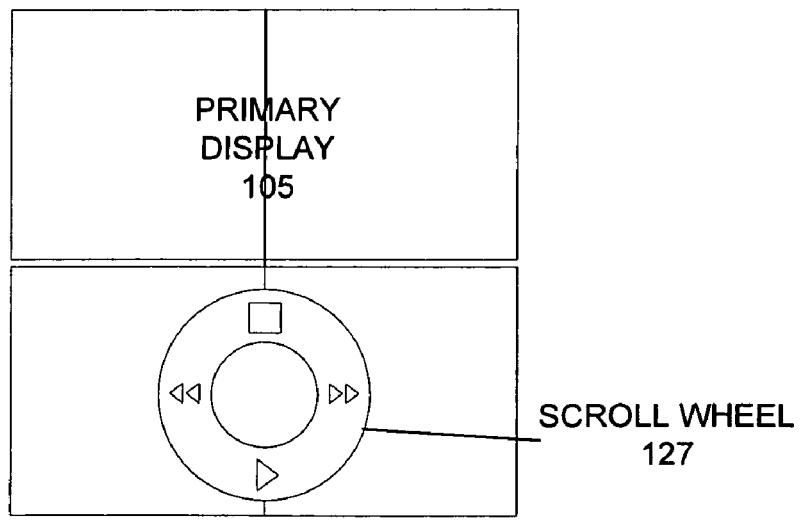

FIG. 1B illustrates a second user interface 125 of the example device. The second user interface 125 includes a multifunction scroll wheel, touch pad, directional pad, or any other type of directional input device 127 suited for selecting and controlling playback of digital audio and music, video, images, or other multimedia content. An embodiment of the second user interface 125 also includes the primary display 105 to display color or monochrome still images, text, and animation or video. As discussed in detail below, an embodiment of the device uses the same display components for both the first and second user interfaces. In a further embodiment, the example device can include speakers and wired or wireless headphone interfaces to allow for the playback of audio and music. The second user interface 125 is well suited for selecting and playing audio, music, video, and multimedia. Although the drawings of this application are not to scale, the example device has approximately the same footprint in either the first or second user interface configurations.

Figure 1C:
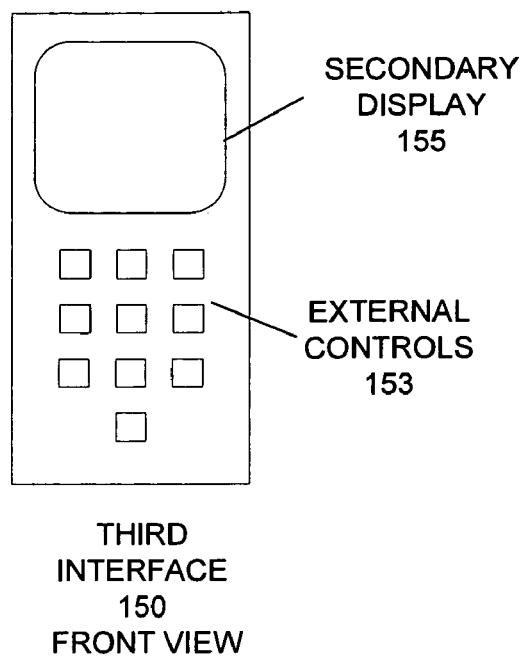

FIG. 1C illustrates a front view of a third user interface 150 of the example device. Although the drawings of this application are not to scale, the third user interface 150 of the example device is roughly half of the width of the first 100 or second 125 user interfaces. As discussed in detail below, the third user interface 150 is accessed by folding either the first 100 or second 125 user interfaces in half along a hinge, which accounts for the difference in size.

In an embodiment, the third user interface 150 includes external controls 153 for frequently accessed functions, such as speaker, headphone, or telephone ringer volume; camera controls; and telephone keypad and telephone call controls. In an embodiment, the third user interface 175 also includes a secondary display 155, which like the primary display 105, can display color or monochrome still images, text, and animation or video. In an embodiment, the third user interface 150 is adapted to make and receive telephone calls and record still images or video, similar to the basic functions of common mobile phones. However, because of the capabilities of the first 100 and second 125 user interfaces, some or all of the functions and external controls and/or displays typically associated with mobile phones may be omitted from the third user interface 150 to simplify the user experience and/or reduce the cost and complexity of the device.

Figure 1D:
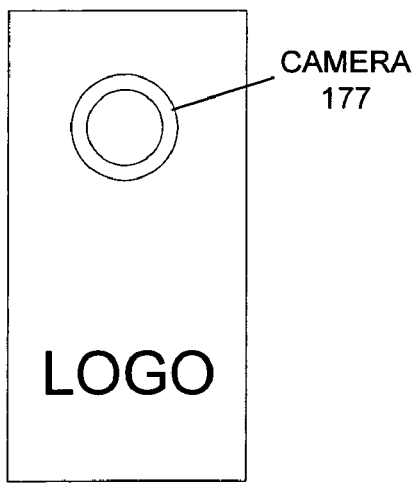

FIG. 1D illustrates a rear view 175 of the example device when configured for the third user interface 150. In an embodiment, the device includes a digital camera 177 and a logo for branding on the rear of the device. In a further embodiment, the camera 177 can be mounted on a swivel so as to face the user when the first 100 or second 125 user interfaces are activated. In an alternate embodiment, a second digital camera is integrated with the primary display 105 for this purpose.

The first 100, second 125, and third 150 user interfaces are described for purposes of illustration and embodiments of the invention can utilize any other types of user interfaces and input devices suitable for the intended function of the device.

Figure 2:
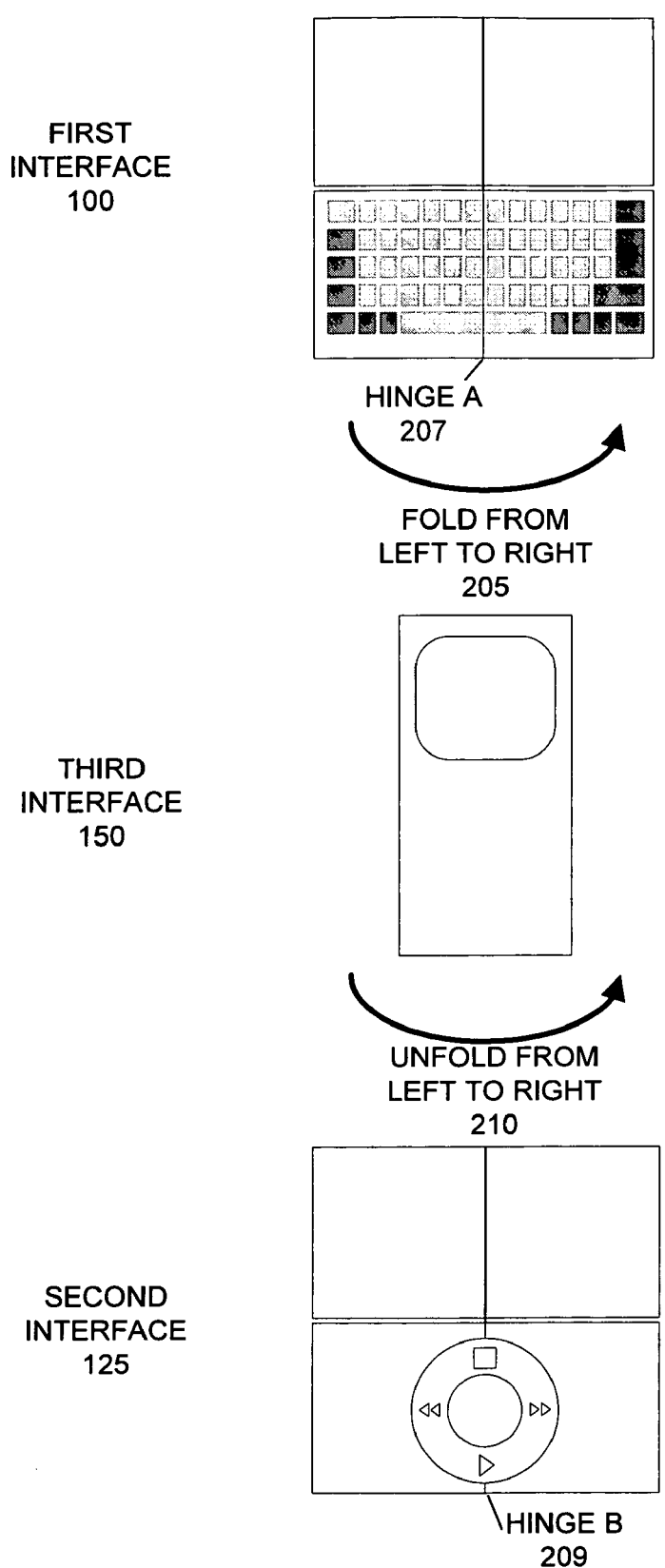
FIG. 2 illustrates the folding operations used to access different user interfaces of an example embodiment of the invention.

FIG. 2 illustrates the folding operations 200 used to access different user interfaces of an example embodiment of the invention. When the device is configured in the first user interface 100, a user may fold 205 an embodiment of the device in half along its center line, via a hinge element A 207 installed along the vertical center line of the device. In this example, the user folds 205 the left side of the device towards the right side of the device.

After this initial fold 205, the device is configured in the third user interface 150, as described above. To return to the first user interface 100, the user can reverse this process, in this example opening the device on the right side and unfolding the device.

When the device is configured in to the third user interface 105, the user may also access the second user interface 125 by further folding the device. From the third user interface configuration 150, the device may be opened along the left side and unfolded 210 from left to right. This reveals the second user interface 125, as described above. To return to the third user interface 150, the user can reverse this process and fold the device from right to left. The folding 210 used to transition between the third user interface 150 and the second user interface 125 is performed along a hinge element B 209.

As described in detail below, the device includes a double hinge arrangement to allow the device as configured in the third user interface to be unfolded from left to right to reveal the third user interface or to be unfolded from right to left to reveal the first user interface. In an embodiment, the device is capable of detecting how it is folded and can change its displays and graphical user interfaces accordingly. Additionally, this embodiment of the device can selectively activate, deactivate, or modify the functions of the controls of one or more interfaces when they are folded and/or hidden from the user. To facilitate user access, an embodiment of the device includes markings or other indicators to direct the user which way to fold the device to reach the desired interface.

To accomplish the folding operations 200 illustrated in FIG. 2, an embodiment of the invention is comprised of three separate modules. FIGS. 3A-3D, 4A-4D, and 5A-5D present multiple views of these three modules. FIGS. 6A-6C illustrate the assembly of these modules into the device shown in FIGS. 1A-1D and FIG. 2.

Figure 3A:
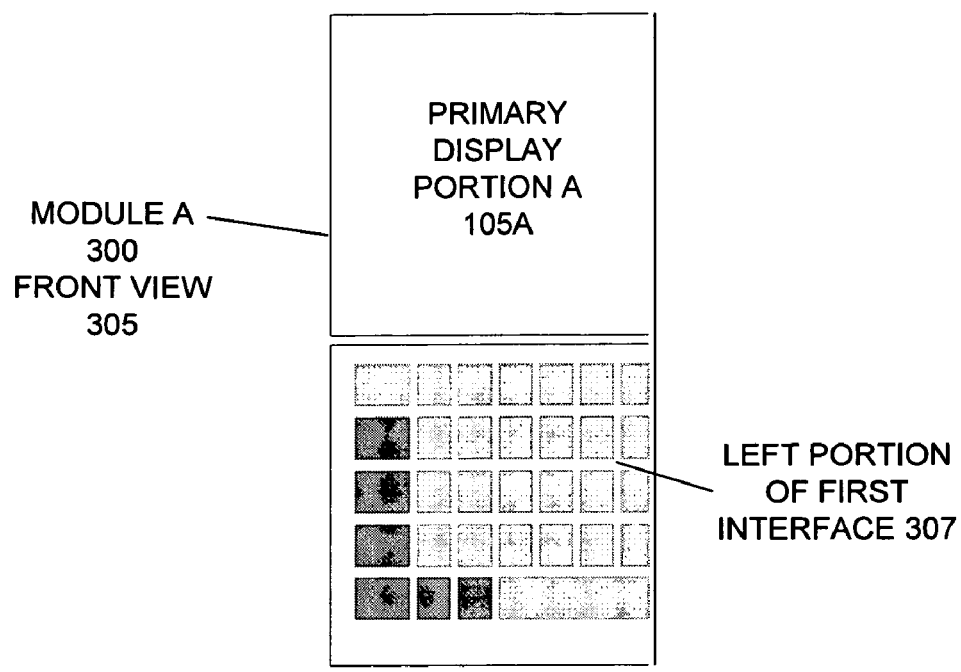
FIGS. 3A-3D illustrate front, rear, and cross-section views of a first module of an example embodiment of the invention.

FIGS. 3A-3D illustrate front, rear, side, and bottom views of a first module 300 (module A) of an example embodiment of the invention. FIG. 3A illustrates a front view 305 of the first module 300. In an embodiment, the first module 300 includes a left-side portion 307 of the first interface, including in this example a left-side portion of the thumb keyboard and a first screen display 105a. The first screen display 105a forms one half of the primary display 105 of the first 100 and second 125 user interfaces.

Figure 3B:
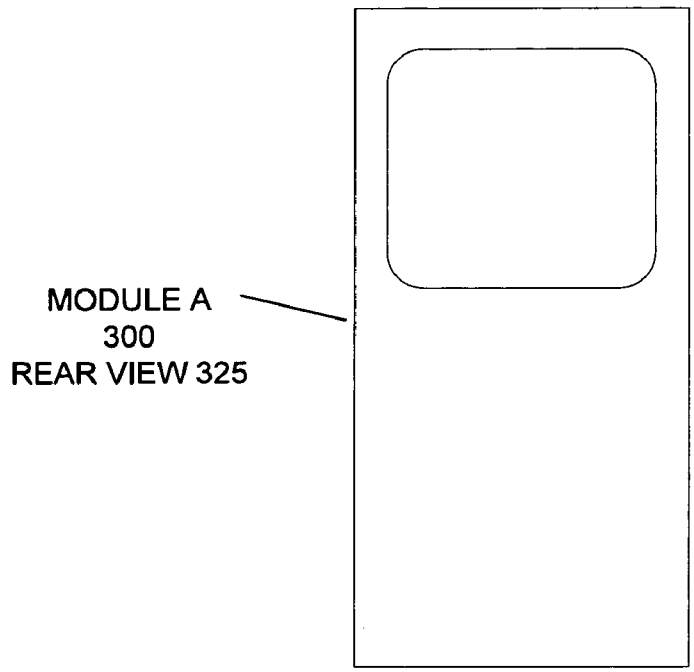

FIG. 3B illustrates a rear view 325 of the first module 300. In this example, the rear side of the first module 300 includes the third interface 150 as shown in FIG. 1C above.

Figure 3C:
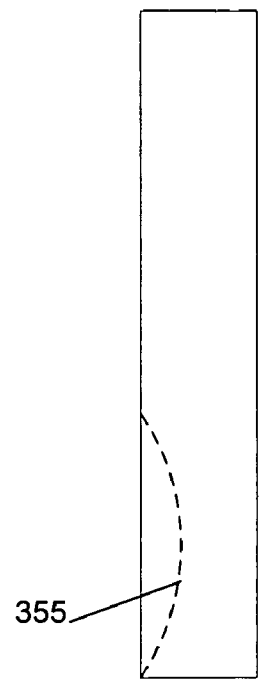
Figure 3D:
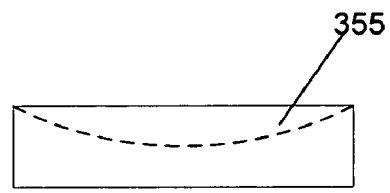

In an embodiment, it is desirable for the rear side of the device to lie flush when unfolded in the first 100 or second 125 user interfaces. To accomplish this, an embodiment of the first module 300 includes a concave surface portion 355 corresponding with the left-side portion 307 of the first interface 300, such as the thumb keyboard shown in FIG. 3A. FIGS. 3C and 3D show side 350 and bottom 375 views of the first module 300, respectively. The dotted lines in these figures represent the outline of the concave surface portions 355 of the device within the interior of the first module. All or a portion of the left-side portion 307 of the first interface 100 shown in FIG. 3A lies within the concave portion 355 of the first module 300.

In general, the portions of the first interface 100 that are different from the second interface 125, such as the thumb keyboard versus the scroll wheel, should be located on the concave portion 355 of the first module 300. Portions of the first interface 100 that are the same as the second interface 125, such as the first screen display 105a comprising half of the primary display 105, an optional camera, and any soft keys or buttons shared by the first 100 and second 125 user interfaces, should be located on the non-concave portion of the first module 300.

Figure 4A:
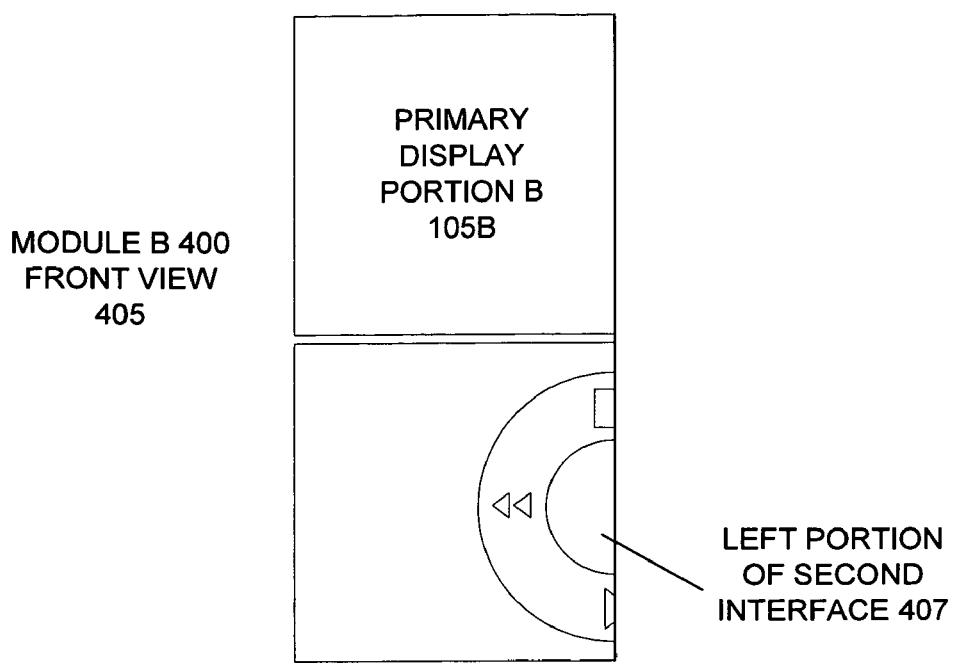
FIGS. 4A-4D illustrate front, rear, and cross-section views of a second module of an example embodiment of the invention.

FIGS. 4A-4D illustrate front, rear, side, and bottom views of a second module 400 (module B) of an example embodiment of the invention. In an embodiment, the second module 400 has the same general shape as the first module 300. FIG. 4A illustrates a front view 405 of the second module 400. In an embodiment, the second module 400 includes a left-side portion 407 of the second interface 125, including in this example a left-side portion of the scroll wheel 127, and a second screen display 105b. The second screen display 105b forms the other half of the primary display 105 of the first 100 and second 125 user interfaces.

Figure 4B:
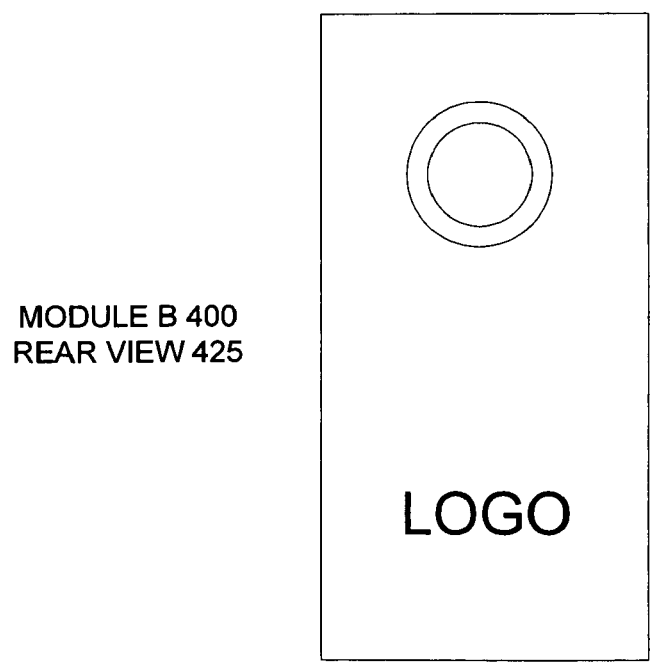

FIG. 4B illustrates a rear view 425 of the second module 400. In this example, the rear side of the second module 400 includes the rear side of third interface 150 as shown in FIG. 1D above.

Figure 4C:
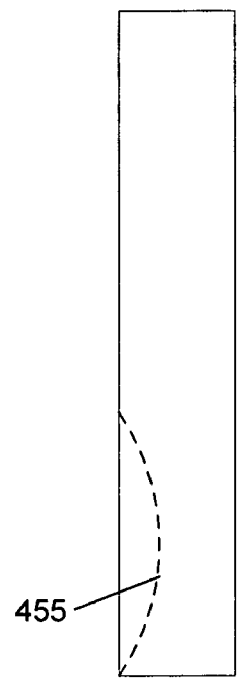
Figure 4D:
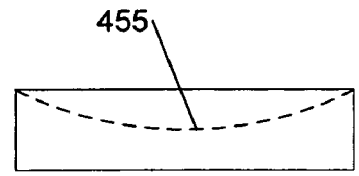

In an embodiment, it is desirable for the rear side of the device to lie flush when unfolded in the first 100 or second 125 user interfaces. To accomplish this, an embodiment of the second module 400 includes a concave portion 455 corresponding with the left-side portion 407 of the first interface 400, such as the portion of the scroll wheel 127 shown in FIG. 4A. FIGS. 4C and 4D show side 450 and bottom 475 views, respectively, of the second module 400. The dotted lines in these figures represent the outline of the concave portion 455 of the device within the interior of the second module 400.

In general, the portions of the second interface 125 that are different from the first interface 100 should be located on the concave portion 455 of the second module 400. For example, the left-side portion 407 of the scroll wheel shown in FIG. 4A can be located on the concave portion 455 of the surface of the second module 400. Portions of the second interface 125 that are the same as the first interface 100 should be located on the non-concave portion of the second module 400.

Figure 5A:
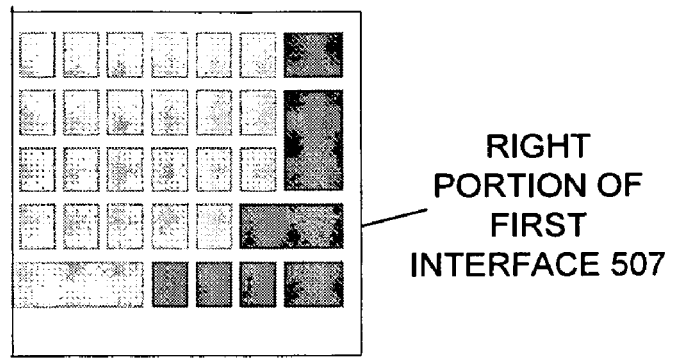
FIGS. 5A-5D illustrate front, rear, and cross-section views of a third module of an example embodiment of the invention.

FIGS. 5A-5D illustrate front, rear, side, and bottom views of a third module 500 (module C) of an example embodiment of the invention. FIG. 5A illustrates a front view 505 of the third module 500. The front side of the third module 500 includes a right-side portion 507 of the first user interface 100. In an embodiment, the front side of the third module 500 only needs to include the part of the right-side portion 507 of the first user interface 100 that is different from a right-side portion of the second user interface 125. In this example, the front side of the third module 500 includes the right-side portion 507 of the thumb keyboard 103 of the first user interface 100.

Figure 5B:
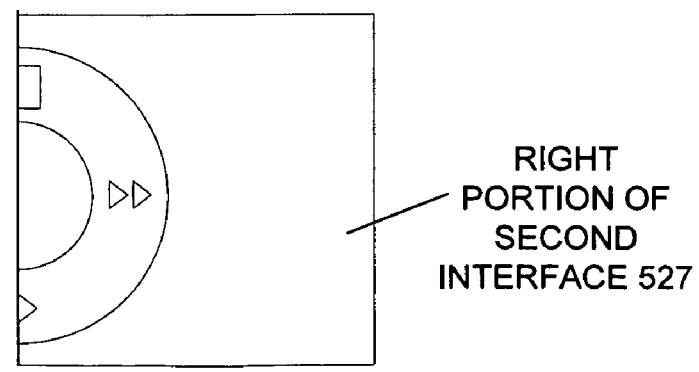
Figure 6A:
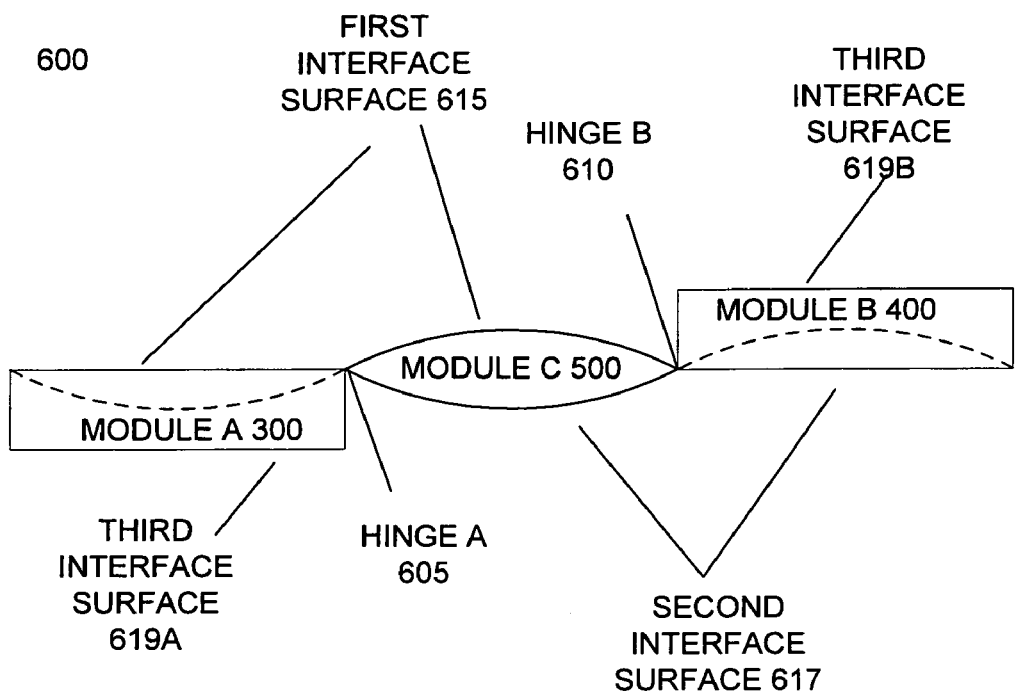
FIGS. 6A-6F illustrate the assembly of modules in an example embodiment of the invention.
Figure 6B:
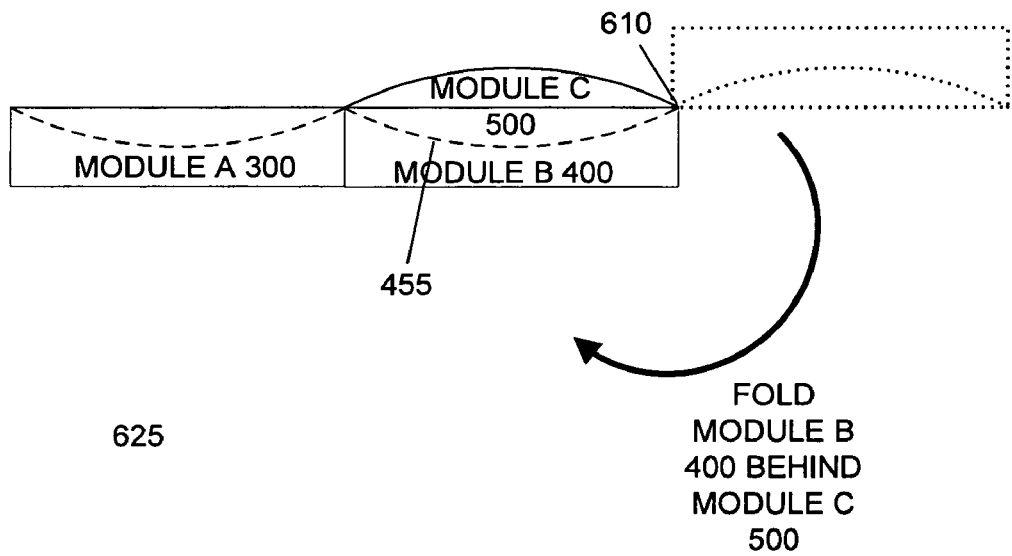
Figure 6C:
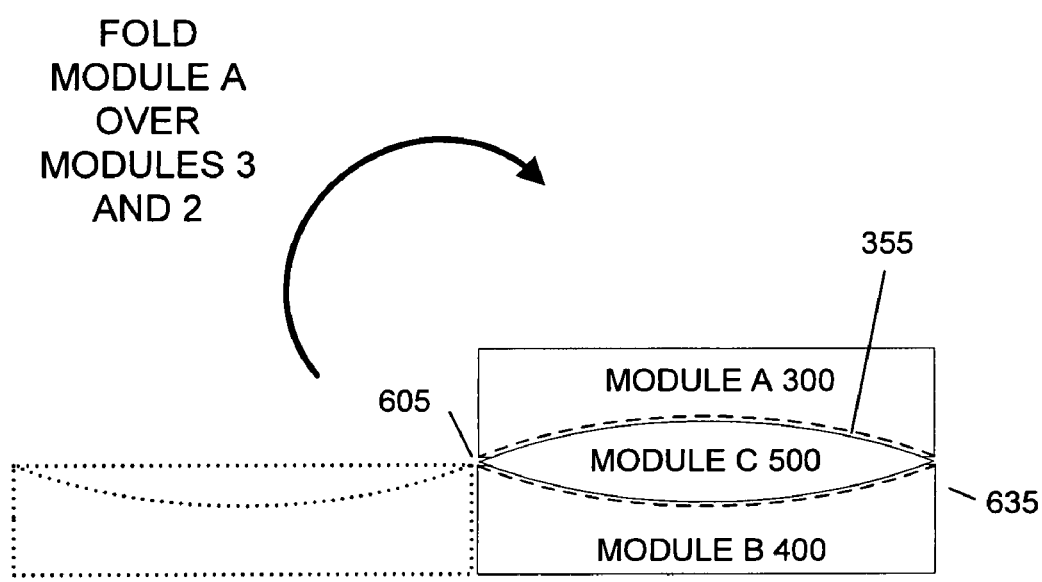

FIG. 5B illustrates a rear view 525 of the third module. The rear side of the third module 500 includes a right-side portion 527 of the second user interface 125. In an embodiment, the rear side of the third module 500 only needs to include the part of the right-side portion 527 of the second user interface 125 that is different from the right-side portion 507 of the first user interface 100. In this example, the rear side of the third module 500 includes the right-side portion 527 of the scroll wheel 127 of the second user interface 125.

Figure 5C:
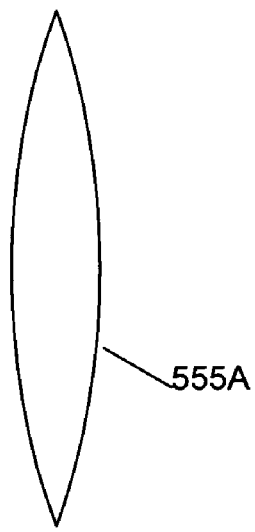
Figure 5D:

FIGS. 5C and 5D show side 550 and bottom 575 views, respectively, of the third module 500. The third module 500 has a convex profile 555. In an embodiment, the convex profiles 555 of the third module 500 matches the concave portions 355 and 455 of the first 300 and second 400 modules. The use of convex and concave portions allows an embodiment of the device to maintain flush front and rear surfaces in all three user interface configurations.

The folding of the device will obscure either the left side or the right side of the first and second modules, depending upon whether the first or second user interface is selected. In an embodiment, external connectors, such as data transfer ports, power input ports, audio input or output ports, memory card slots, and the like, may be located on the top or bottom sides of the first, second and/or third module to allow for access in all user interface configurations.

FIGS. 6A-6F illustrate the assembly of modules in an example embodiment of the invention. FIG. 6A illustrates an initial assembly 600 of the modules of an embodiment of the invention in an unfolded arrangement for clarity. FIG. 6A illustrates a bottom view of the first 300, second 400, and third 500 modules. In this initial assembly, the first module 300 is connected on its right side with left side of the third module 500 via a first hinge 605 (hinge A). In an embodiment, the hinge is comprised of a thin, flexible ribbon. The first 300 and third 500 modules are arranged such that the first interface portions of the first 300 and third 500 modules face the same direction. For example, the thumb keyboard portion 307 on the concave portion of the first module 300 faces the same direction as the thumb keyboard 507 portion on the third module 500. In this arrangement, portions 307 and 507 form a first interface surface 615 including the entire thumb keyboard 103 and a portion 105a of the display screen 105 shown in FIG. 1A.

The second module 400 is connected on its left side with right side of the third module 500 via a second hinge 610 (hinge B). In an embodiment, the second hinge 610 is also comprised of a thin, flexible ribbon. The second 400 and third 500 modules are arranged such that the second interface portions of the second 400 and third 500 modules face the same direction. For example, the scroll wheel portion 407 on the concave portion of the second module faces the same direction as the scroll wheel portion 527 on the third module. In this arrangement, portions 407 and 527 form a second interface surface 617 including the entire scroll wheel 127 and a portion 105b of the display screen 105 shown in FIG. 1B.

The rear sides of modules 300 and 400 include portions of the third interface 150 form third interface surfaces 619a and 619b including the third interface 150 shown in FIG. 1C.

In a further embodiment, flexible circuit board traces and other electronic components on a printed flexible circuit (for example comprised of poly(4,4'-oxydiphenylene-pyromellitimide, widely known under the trade name Kapton, or any other similar material) can be embedded in the first 605 and second 610 hinges to allow for power, data, control, and other electrical connections between the modules. In other embodiments, wireless, capacity, inductive, or other types of electrical connections or coupling can be used to carry power, data, control, and other electrical connections between the modules.

FIGS. 6B-6C illustrates the assembly of the connected first, second, and third modules into a complete device. The second module 400 is folded 625 around the second hinge 610 so that it is underneath the third module 500, such that one of the convex sides of the third module 500 nests inside the concave portion 455 of the second module 400. Next, as shown in FIG. 6C, the first module 300 is folded around the first hinge 605 so that it is on top of the combination 635 of the third module 500 and the second module 400, such that the other convex side of the third module 500 nests inside the concave portion 355 of the first module 300.

Figure 6D:
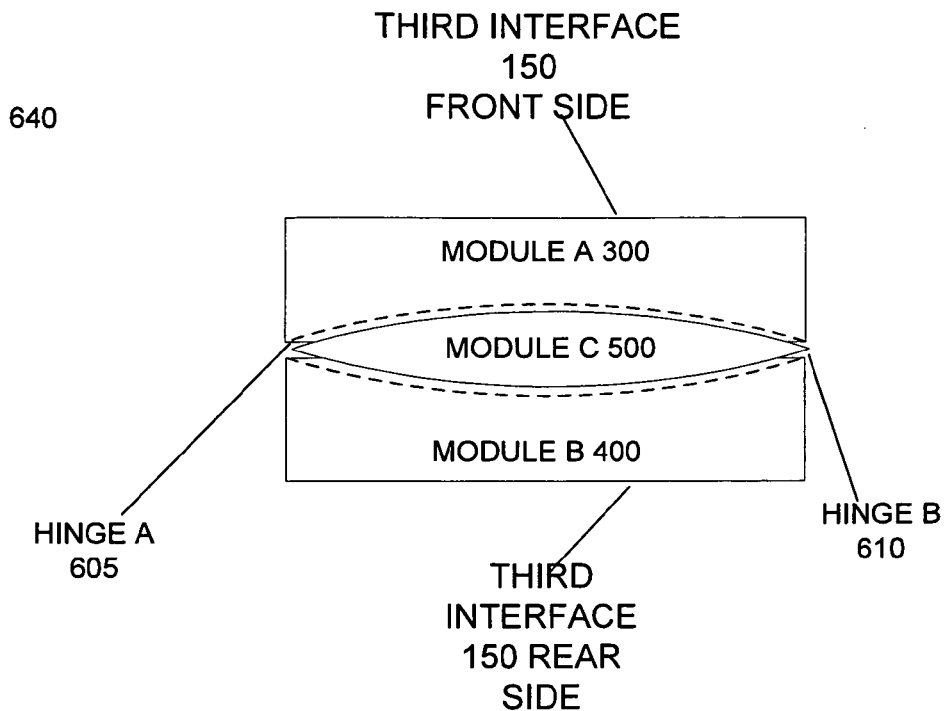

FIG. 6D illustrates a cross-section view 640 of an embodiment of the device configured for the third user interface 150, as shown in FIGS. 1C and 1D. In this configuration, the rear side of the first module 300 (shown in FIG. 3B) corresponds with the front side portion of the third user interface of FIG. 1C. Additionally, the rear side of the second module 400 (shown in FIG. 4B) corresponds with the rear side portion of the third user interface 150 of FIG. 1D. In this configuration, the first 100 and second 125 user interfaces are folded into the interior of the device and not visible to the user.

Figure 6E:
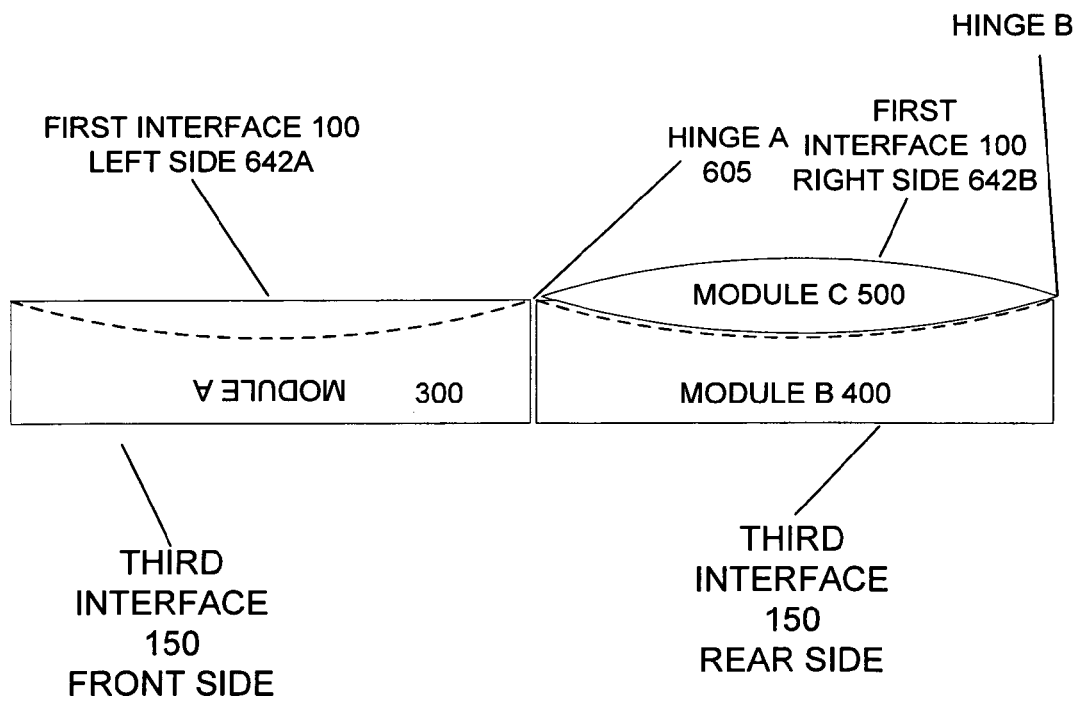

FIG. 6E illustrates a cross-section view 645 of an embodiment of the device configured for the first user interface 100, as shown in FIG. 1A. The first user interface configuration 100 is accessed from the third user interface configuration 150 by unfolding the device along the first hinge 605. In this configuration, the front side of the first module 300 presents the left side portion 642a of the first user interface of FIG. 1A to the user. The exposed surface of the third module 500 presents at least a portion of the right side 642b of the first user interface of FIG. 1A to the user. The rear sides of the first 300 and second 400 module present the third user interface 150 of FIG. 1C to a user. In an embodiment, the third user interface 150 is deactivated upon exposure of the first user interface 100. Because of the concave and convex sides of the modules, the rear surfaces of the first 300 and second 400 modules are flush, as shown in FIG. 6E. The second user interface 125 remains in the interior of the folded device and is not visible to the user.

Figure 6F:
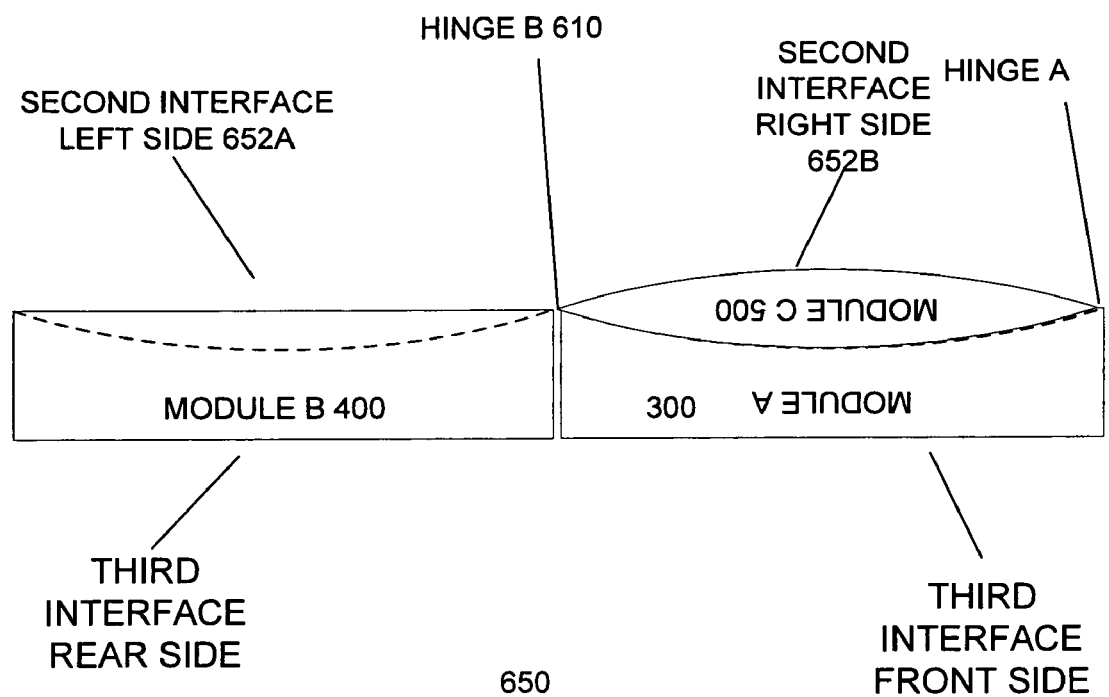

FIG. 6F illustrates a cross-section view 650 of an embodiment of the device configured for the second user interface 125, as shown in FIG. 1B. The second user interface configuration 125 is accessed from the third user interface configuration 150 by unfolding the device along the second hinge 610. In this configuration, the front side of the second module 400 presents the left side portion 652a of the second user interface 125 of FIG. 1B to the user. The exposed surface of the third module 500 presents at least a portion of the right side 652b of the second user interface 125 of FIG. 1B to the user. The rear sides of the first and second module present the third user interface 150 of FIG. 1C to a user. In an embodiment, the third user interface 150 is deactivated upon exposure of the second user interface 125. Because of the concave and convex sides of the modules, the rear surfaces of the first 300 and second 400 modules are flush, as shown in FIG. 6F. The first user interface 100 remains in the interior of the folded device and is not visible to the user.

During folding operations, it is desirable for some of the modules to remain locked together. For example, when unfolding the example device along the first hinge 605 as shown in FIG. 6E, it is desirable for the second 400 and third 500 modules to remain locked together. Similarly, when unfolding the example device along the second hinge 610 as shown in FIG. 6F, it is desirable for the first 300 and third 500 modules to remain locked together. Embodiments of the invention can employ a mechanical, electronic, and/or magnetic latching system to achieve this goal.

Figure 7:
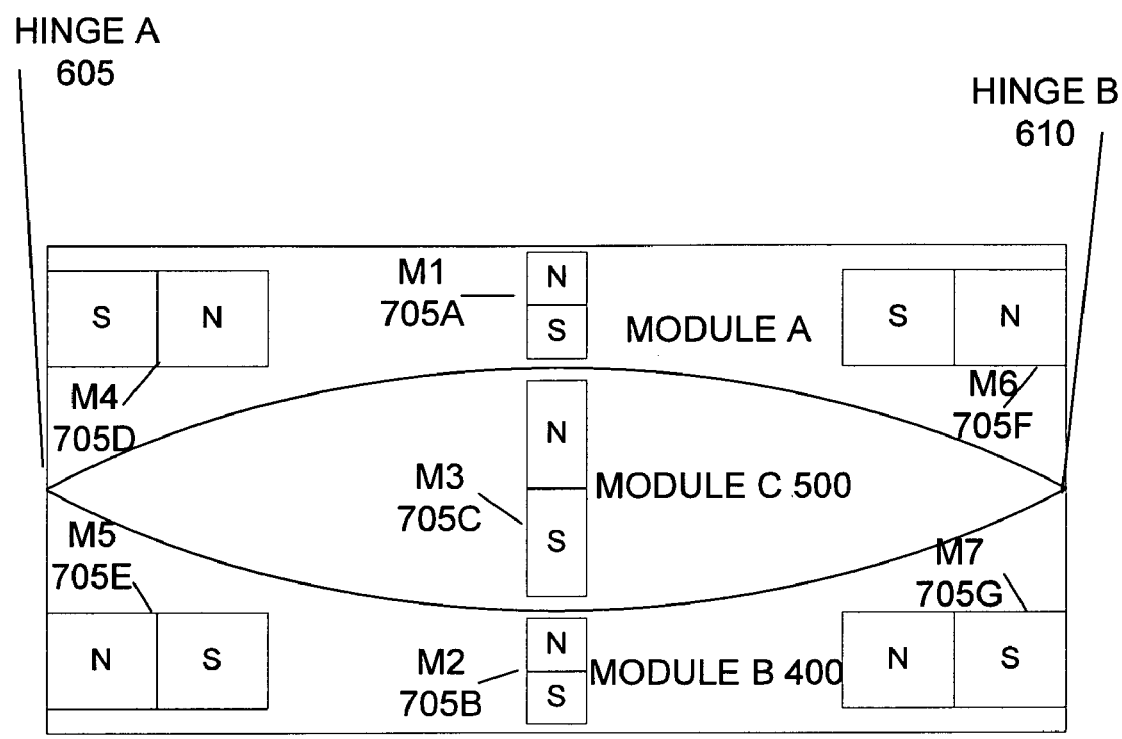
FIG. 7 illustrates an example latching system used in an example embodiment of the invention.

FIG. 7 illustrates an example latching system 700 used in an example embodiment of the invention. FIG. 7 uses a set of permanent magnets 705 arranged in the first, second and third modules to latch the modules together. When the example device is configured for the third user interface, the magnets M1 705a, M2 705b, and M3 705c lock the first 300, second 400, and third 500 modules together. Magnets M1 705a, M2 705b, and M3 705c are in contact or very close proximity to each other, so as to provide sufficient magnetic force to hold the modules together under ordinary conditions.

To unfold the example device and expose the first user interface, a user can pry apart the first 300 and third 500 modules, breaking the connection between magnet M1 705a in first module 300 and M3 705c in the third module 500. In an embodiment, a groove or recess along the right side of the example device assists the user with prying apart the first 300 and third 500 modules and unfolding the device along the first hinge 605 on the left side of the example device. Because magnetic force decreases rapidly with distance (roughly following an inverse square rule), once contact between magnets M1 705a and M3 705c is broken, the first module 300 is free to pivot around the first hinge 605 and expose the first interface 100. However, magnets M3 705c and M2 705b still hold the third 500 and second 400 modules together. In an embodiment, the second hinge 610 between the second 400 and third 500 modules along the right side of the device prevents user pressure on the right side of the device from prying the second 400 and third 500 modules apart.

Similarly, to unfold and expose the second user interface, a user can pry apart the second 400 and third 500 modules, breaking the connection between magnet M2 705b in second module 400 and M3 705c in the third module 500. In an embodiment, a groove or recess along the left side of the example device assists the user with prying apart the second 400 and third 500 modules and unfolding along the second hinge 610 on the right side of the example device. Once contact between magnets M2 705b and M3 705c is broken, the second module 400 is free to pivot around the second hinge 610 and expose the second interface 125. However, magnets M3 705c and M1 705s still hold the third 500 and first 100 modules together. In an embodiment, the first hinge 605 between the first 300 and third 500 modules along the left side of the device prevents user pressure on the left side of the device from prying the first 300 and third 500 modules apart.

In addition to magnets M1 705a, M2 705b, and M3 705c, magnets M4 705d, M5 705e, M6 705f, and M7 705g are located along the sides of the first 300 and second 400 modules. Magnets M4 705d and M5 705e hold the sides of the first 300 and second 400 modules together when the device is configured for the first user interface 100. Similarly, magnets M6 705f and M7 705g hold the sides of the first 300 and second 400 modules together when the device is configured for the second user interface 125. These additional magnets 705d-705g allow the device to retain its shape when fully unfolded to expose the first or second interfaces, as if it were composed of a single rigid module, rather than constantly flexing or pivoting around the first 605 or second 610 hinge. Although these magnets help the device retain its shape, when a user applies sufficient force, contact between these magnets is broken and the modules are once again free to pivot around the first and second hinges to return to the third user interface configuration 150.

Embodiments of the invention employ permanent magnets 705 for M1, M2, M3, M4, M5, M6, and M7. The magnets 705 should be sufficiently strong so as to hold the modules together as described above, but sufficiently weak so that a user can easily pry the magnets apart to open and close the device along the first and second hinges. In a further embodiment, electromagnet coils can be used to temporarily weaken the force of the magnets 705 to assist users with opening and closing the device. In an alternate embodiment, some or all of the permanent magnets 705 are replaced with electromagnets that are selectively energized to hold or release modules.

As discussed above, the concave portions of the first and second modules and the convex portions of the third module enable a flush profile for the device when configured for the first and second user interfaces. In practice, the third module may be very thin, so that the convex and concave surfaces of the first and second interfaces do not detract from usability of these interfaces. However, in some applications, it may be desirable for either the first or second user interface to present a flat surface to the user. For example, it may be desirable for the thumb keyboard of the first user interface to be flat, rather than convex and concave, to make typing easier.

Figure 8:
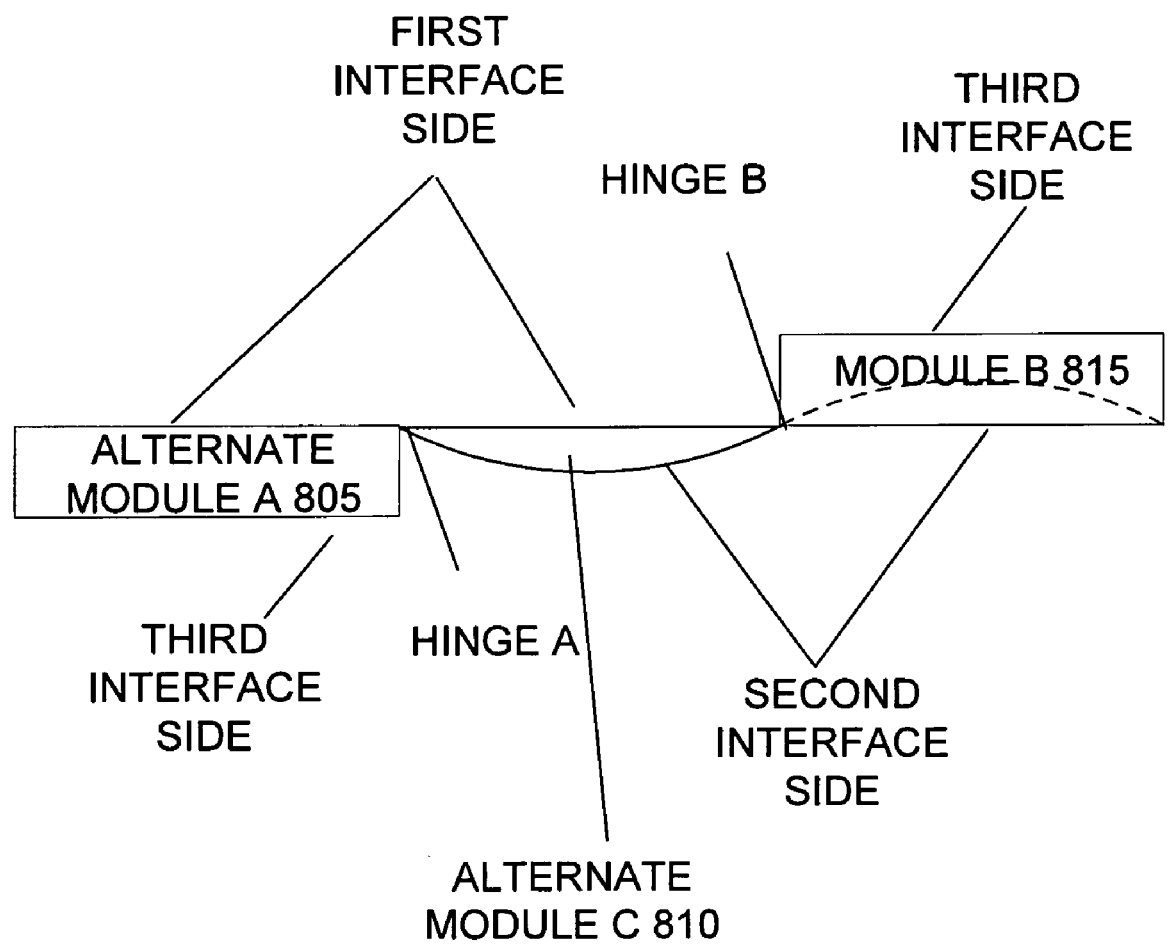
FIG. 8 illustrates alternate first and third modules of an example embodiment of the invention.

FIG. 8 illustrates alternate first and third modules of an example embodiment of the invention. FIG. 8 illustrates a bottom profile view 800 of the three modules comprising an alternate embodiment of the invention. The alternate first module 805 is similar to the first module 300 illustrated in FIGS. 3A-3D. However, the alternate first module 805 has a flat front surface without any concave portion.

The alternate third module 810 is similar to the third module 500 illustrated in FIGS. 5A-5D. However, the alternate third module 810 has a flat front surface, rather than the convex front surface shown in FIG. 5A-5D.

The alternate embodiment of the device shown in FIG. 8 also includes a second module 815 similar to the second module 400 shown in FIGS. 4A-4D.

The alternate embodiment of the device is assembled in a manner similar to that shown in FIGS. 6A-6F. However, because the front surfaces of the first 805 and third 810 modules are flat, this alternate embodiment of the device presents a flat front surface for the first user interface 100. The second user interface 125 of this alternate embodiment of the device still has a concave and convex profile, similar to the other embodiments of the device.

In still further embodiments, both the first and second modules can have flat, rather than concave, front surfaces. The third module should be flat and as thin as possible in these embodiments to minimize the differences in thickness between the left and right sides of the first and second user interfaces.

In other embodiments, the third module can be the same width and height as the first and second modules, so that the third module completely covers the front surface of the first or second modules when these modules' interfaces are not used. In additional embodiments, the third module can include a display screen on its front and/or back side, which can be comprised of two separate display devices or a single two-sided display device. In another embodiment, the device can fold from top to bottom around horizontal hinges, rather than from left to right around vertical hinges.

As discussed above, the primary display 105 of the first 100 and second 125 interfaces is comprised of a first display device 105a in the first module and a second display device 105b in the second module. These two display devices 105a and 105b are abutted adjacent to each other to form the primary display 105. Many display devices include a bezel. Thus, the primary display may be bisected by the bezels of the first and second display devices. This may be visually displeasing to users.

Figure 9A:
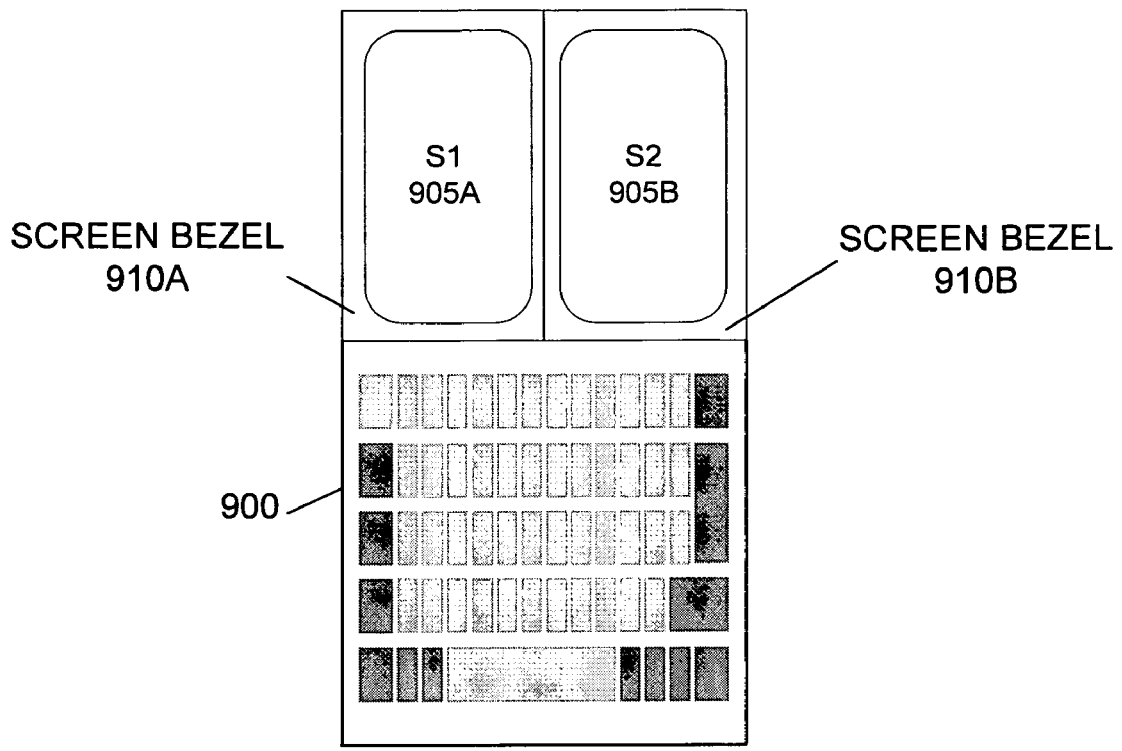
FIG. 9A-9E illustrates optical systems for presenting a seamless display between two or more display devices for use with an example embodiment of the invention.

FIG. 9A-9E illustrates optical systems for presenting a seamless display between two or more display devices for use with an example embodiment of the invention. FIG. 9A illustrates the front view 900 of an example embodiment of the device in the first user interface configuration. In this configuration, the primary display is comprised of a first display device S1 905a on the left side and a second display device S2 905b on the right side. The center of the primary display is bisected by the bezels 910a and 910b of the first and second display devices.

Figure 9B:
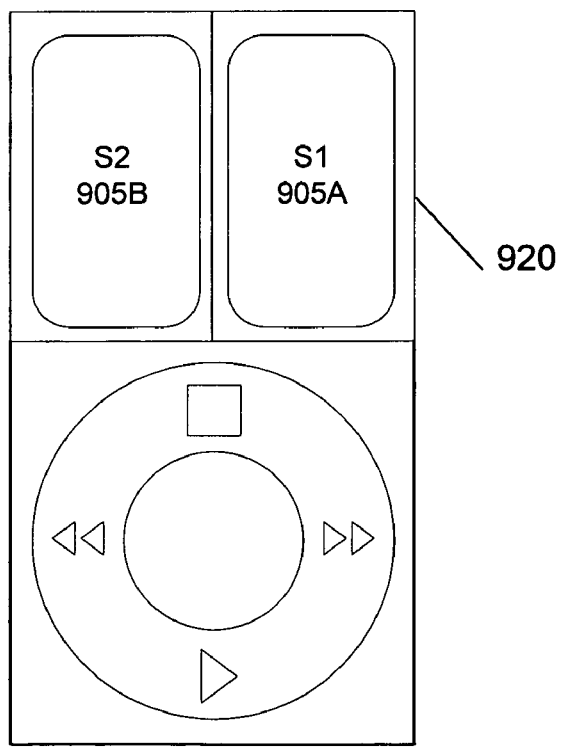

FIG. 9B illustrates the front view 920 of an example embodiment of the device in the second user interface configuration. In this configuration, the primary display 905 is comprised of a first display device S1 905a on the right side and a second display device S2 905b on the left side. The center of the primary display is bisected by the bezels of the first and second display devices.

It should be noted that the action of the double hinge arrangement of the modules described above results in the first and second display devices 905a and 905b swapping positions between the first 100 and second 125 user interface configurations. Thus, the graphics hardware and software of the device should take this change in positions into account when generating images for the primary display 905. When the device is configured in the first user interface configuration 100, the first display device S1 905a should display images corresponding with the left side of the primary display 905 and the second display device S2 905b should display images corresponding with the right side of the primary display 905. When the device is configured in the second user interface configuration 125, the first display device S1 905a should display images corresponding with the right side of the primary display 905 and the second display device S2 905b should display images corresponding with the left side of the primary display 905.

One way to minimize or eliminate the appearance of bezels in the center of the primary display is to use first and second display devices that have very thin bezels along the left and right sides, if possible.

Figure 9C:
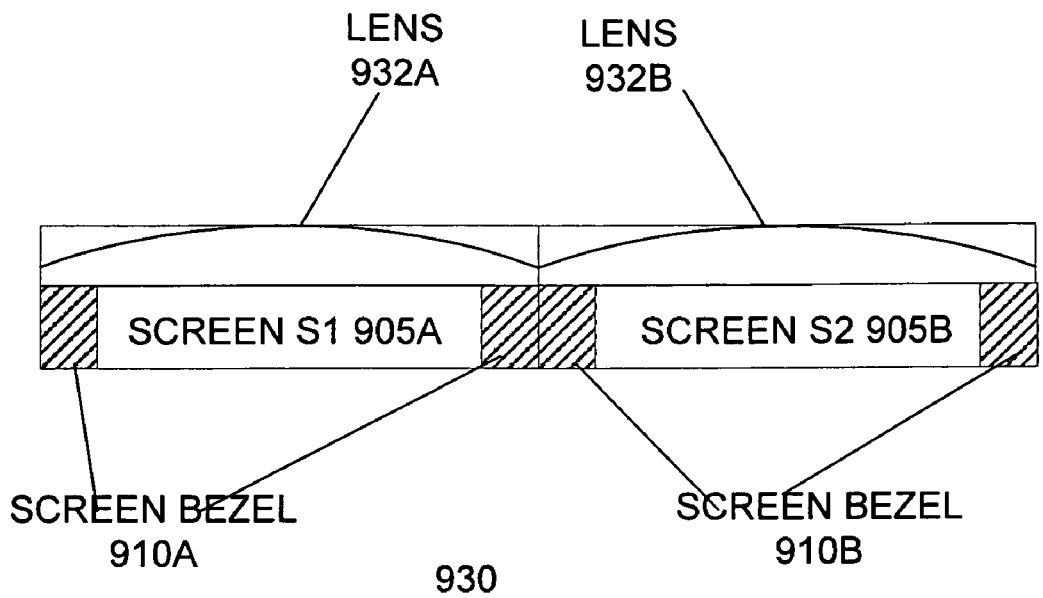

FIG. 9C illustrates a first optical system 930 adapted to minimize or eliminate the appearance of bezels in the center of the primary display. FIG. 9C illustrates a cross-section view of the first and second display devices and the first optical system. The remaining portions of the device are omitted from FIG. 9C for clarity. The first optical system 900 includes a pair of magnifying lenses 932 fixed over the first and second display devices 905. Each of the magnifying lenses 932 is adapted to magnify the image of a display device so that the magnified image covers the entire width of the module including the display device. Thus, when the first and second modules are abutted adjacent to each other, the magnified images of the first and second display devices will appear as one seamless image. The graphics hardware and software of the device can warp or distort the images to compensate for distortion introduced by the lenses.

Figure 9D:
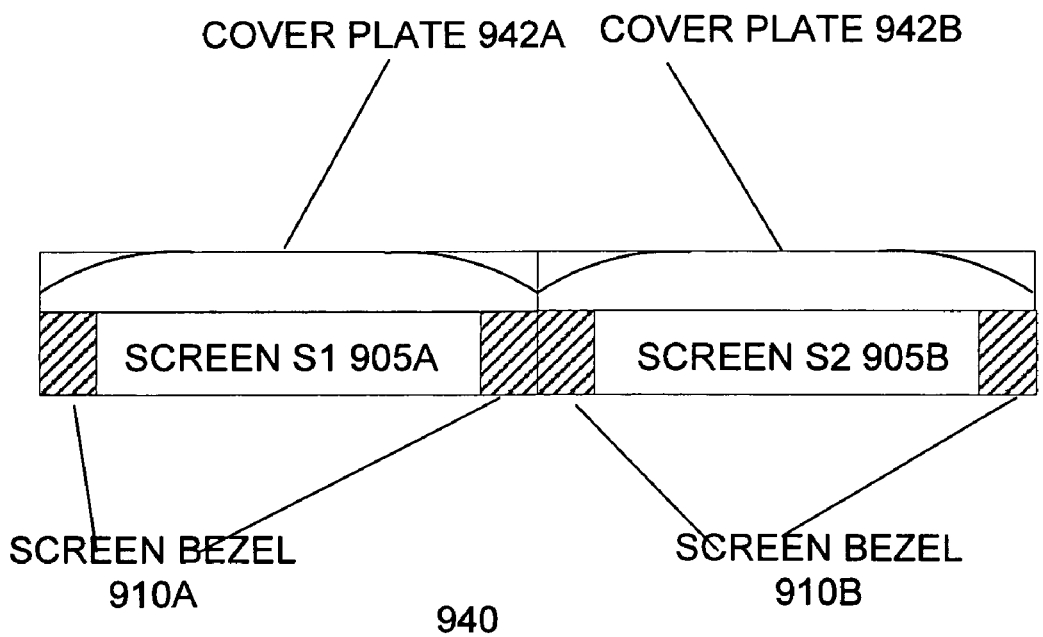

FIG. 9D illustrates a second optical system 940 adapted to minimize or eliminate the appearance of bezels in the center of the primary display. FIG. 9D illustrates a cross-section view of the first and second display devices and the second optical system. The remaining portions of the device are omitted from FIG. 9D for clarity. The second optical system 940 includes a pair of cover plates 942 that are curved at the left and right edges to provide lenses there. The image of the display device 905 when viewed through the cover plate 942 appears to be shifted to the edges of the modules, so that the bezel 910 becomes invisible. The graphics hardware and software of the device warps or distorts the images at their edges to compensate for edge distortions by the lenses at the edges of the cover plates 942. The graphics hardware and software of the device can also repeat the image on either side of the joint between two display devices 905 to increase the viewing angle beyond which the joint appears. Optical systems similar to the second optical system 940 are described in detail in U.S. Pat. No. 6,927,908, entitled "Visual display screen arrangement," which is incorporated by reference herein.

Figure 9E:
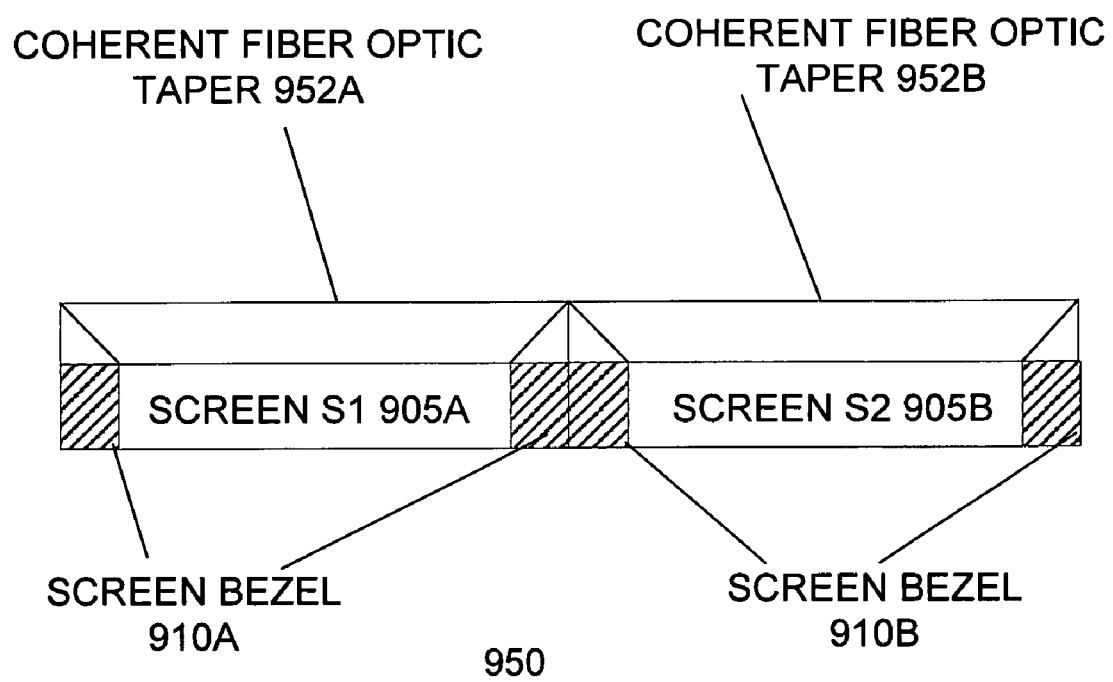

FIG. 9E illustrates a third optical system 950 adapted to minimize or eliminate the appearance of bezels in the center of the primary display. FIG. 9E illustrates a cross-section view of the first and second display devices 905 and the third optical system 950. The remaining portions of the device are omitted from FIG. 9E for clarity. The third optical system 950 includes a pair of coherent fiber optic tapers 952 affixed to the first and second display devices 905. Each fiber optic taper 952 is adapted to magnify the image of a display device 905 so that the magnified image covers the entire width of the module including the display device. Thus, when the first and second modules are abutted adjacent to each other, the magnified images of the first and second display devices 905 will appear as one seamless image.

Coherent fiber optic tapers 952 are widely available optical components. Fiber optic tapers can be formed by bundling and bonding together glass or plastic optical fibers coherently, so that the relative position of each fiber with respect to the other optical fibers is the same at either end of the bundle. The coherent bundle of fibers are then placed under tension to draw the fibers into a tapered bundle. The tapered bundle is then cut to the appropriate size and polished to provide clean optical input and output interfaces.

Figure 10:
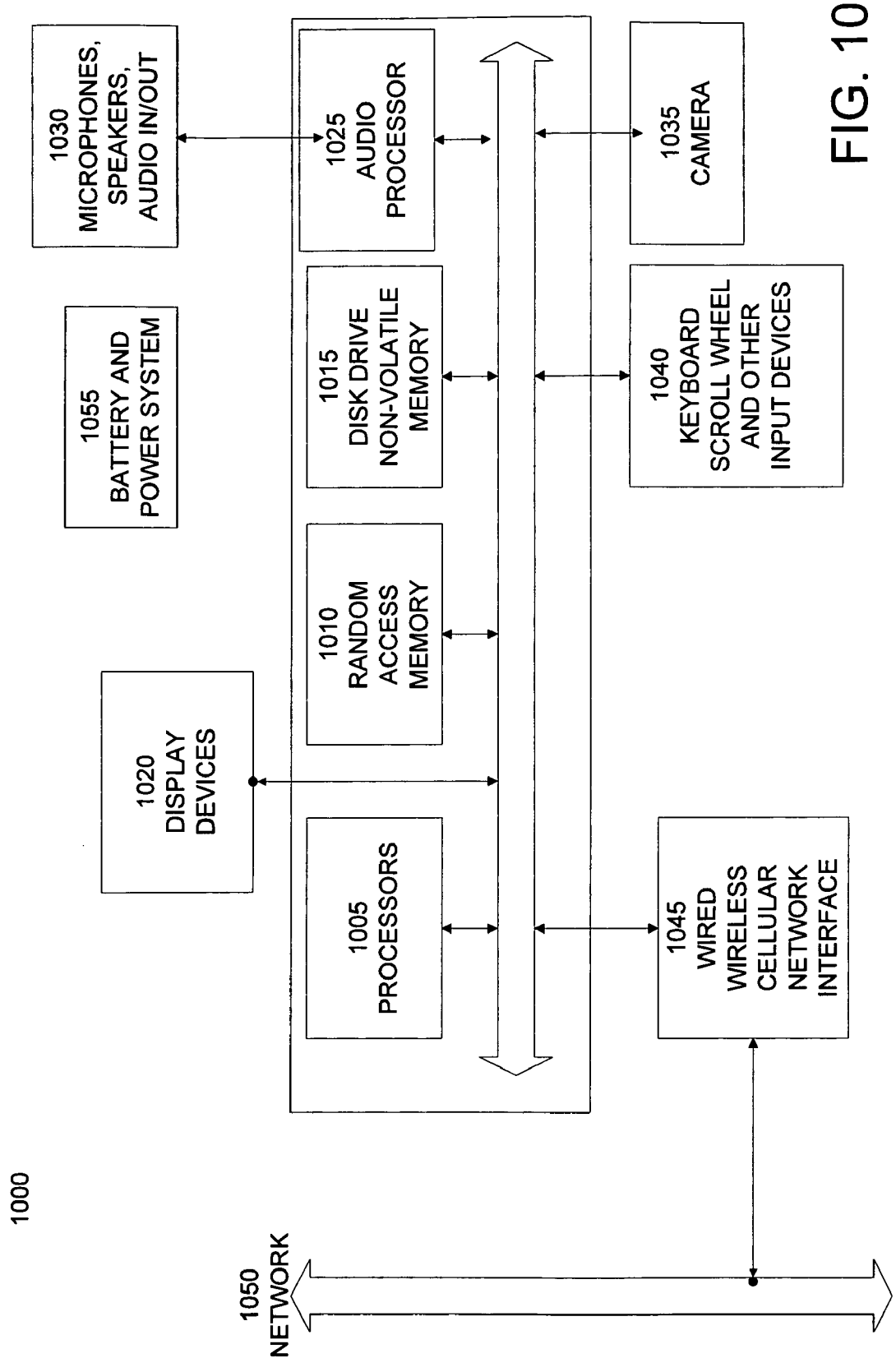
FIG. 10 illustrates an electronic system to be integrated with an example embodiment of the invention.

FIG. 10 illustrates an electronic system 1000 to be integrated with an example embodiment of the invention. The electronic system 1000 includes one or more general purpose or specialized processors 1005, which can include microprocessors, microcontrollers, system on a chip (SoC) devices, digital signal processors, graphics processing units, ASICs, and other information processing devices. The electronic system 1000 also includes random access memory 1010 and non-volatile memory 1015, such as a magnetic or optical disk drive and/or flash memory devices.

The electronic system 1000 includes one or more display devices 1020, such as the two display devices comprising the primary display 105 and an additional display device comprising the secondary display 155. The electronic system 1000 may also include an audio processor 1025 for generating and receiving sound via speakers, microphone, or other audio inputs and outputs 1030; one or more cameras 1035 for capturing still and/or moving images; and input devices 1040 such as keyboards; scroll wheels; buttons; keypads; touch pads, touch screens, and other touch sensors; joysticks and direction pads; motion sensors; global positioning system (GPS) and other location determining sensors; and/or any other type of input device known in the art.

The electronic system 1000 may also include one or more modems and/or wired or wireless network interfaces 1045 (such as the 802.11 family of network standards) for communicating data via local-area networks 1050; wide-area networks such as the Internet; CDMA, GSM, or other cellular data networks of any generation or protocol; or any other standard or proprietary networks. The electronic system 1000 can also include a data transfer interface, such as wired or wireless USB, IEEE 1394 (Firewire), Bluetooth, or ultra wideband data transfer interfaces.

The electronic system 1000 can include a power system 1055 for obtaining electrical power from an external source, such as AC line current or DC power tailored to the electronic system 1000 via an external power supply, as well as one or more rechargeable or one-time use batteries, fuel cells, or any other electrical energy generation device.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the systems and methods described herein may be implemented for use in a number of different types of electronic devices, such cellular or wireless network telephones; personal digital assistants; portable digital music, video, and media players; video game systems; notebook, sub-notebook, tablet, and other portable computer systems; wireless electronic mail and messaging devices; and any other electronic device that requires multiple user interfaces. Moreover, the specific types of user interfaces and the arrangement of input devices within these interfaces is intended for the purposes of illustration and does not limit the types and arrangements of user interfaces capable of being implemented with embodiments of the invention. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An interface for an electronic device, the interface comprising:
 a first module including a first surface including a first portion of a first interface;
 a second module including a second surface including a first portion of a second interface; and
 a third module including a third surface including a second portion of the first interface and a fourth surface opposite to the third surface and including a second portion of the second interface;
 wherein the third module is connected with the first module via a first folding joint and with the second module via a second folding joint, such that the first, second, and third modules can be folded along the first and second folding joints into a first configuration that exposes the first and second portions of the first interface and hides the first and second portions of the second interface and into a second configuration that exposes the first and second portions of the second interface and hides the first and second portions of the first interface.

2. The interface of claim 1, wherein the first folding joint is located on a first side of the third module and the second folding joint is located on a second side of the third module that is not adjacent to the first side.

3. The interface of claim 1, wherein the first configuration and the second configuration have approximately the same footprint.

4. The interface of claim 1, further comprising:
 a latching system adapted to hold the second and third modules together while the first module is rotating around the first folding joint and to hold the first and third modules together while the second module is rotating around the second folding joint.

5. The interface of claim 4, wherein the latching system includes a magnet.

6. The interface of claim 1, wherein the first surface includes a first concave region and the third surface includes a first convex region adapted to nest within the first concave region in the second configuration.

7. The interface of claim 6, wherein the second surface includes a second concave region and the fourth surface includes a second convex region adapted to nest within the second concave region in the first configuration.

8. The interface of claim 6, wherein the second surface and the fourth surfaces are substantially flat, such that the first and second portions of the second interface form a substantially flat surface in the second configuration.

9. The interface of claim 1, wherein the first surface includes a first common interface portion, the second surface includes a second common interface portion, and the third module is smaller than the first and second modules, such that the first and second common interface portions are exposed in the first and second configurations.

10. The interface of claim 9, wherein the first common interface portion includes a first display device and the second common interface portion includes a second display device, such that the first and second display devices form a primary display.

11. The interface of claim 10, wherein the first and second display devices exchange positions from the first to the second configuration, and further comprising:
logic adapted to display a first portion of an image with the first display device and the second portion of the image with the second display device in the first configuration and to display the first portion of the image with the second display device and the second portion of the image with the first display device in the second configuration.

12. The interface of claim 10, further comprising an optical system adapted to minimize the visibility of bezels of the first and second display devices.

13. The interface of claim 1, wherein the folding joints include wiring adapted to communicate signals between the first, second, and third modules.

14. The interface of claim 1, further comprising:
the first module including a fifth surface including a first portion of a third interface; and
the second module including a sixth surface including a second portion of the third interface;
wherein the first, second, and third modules can be folded along the first and second folding joints into a third configuration that exposes the third interface and hides the first and second interfaces.

15. The interface of claim 14, wherein the third configuration has a footprint approximately one half of the footprint of the first configuration.

16. The interface of claim 1, further comprising logic adapted to activate the first interface and deactivate the second interface in the first configuration and to activate the second interface and deactivate the first interface in the second configuration.

17. The interface of claim 1, wherein:
the first folding joint and the second folding joint are located within a first plane;
the first module includes a fifth surface opposite to the first surface, wherein the fifth surface is parallel to the first plane when the interface is folded into the first configuration and into the second configuration; and
the second module includes a sixth surface opposite to the second surface, wherein the sixth surface is parallel to the first plane when the interface is folded into the first configuration and into the second configuration.

18. The interface of claim 1, wherein:
the first configuration hides the first and second portions of the second interface by positioning the second surface of the second module in direct contact with the fourth surface of the third module; and
the second configuration hides the first and second portions of the first interface by positioning the first surface of the first module in direct contact with the third surface of the third module.

19. An interface for an electronic device, the interface comprising:
a first module including a first surface including a first portion of a first interface;
a second module including a second surface including a first portion of a second interface; and
a third module including a third surface including a second portion of the first interface and a fourth surface opposite to the third surface and including a second portion of the second interface;
wherein the third module is connected with the first module via a first folding joint and with the second module via a second folding joint, such that the first, second, and third modules can be folded along the first and second folding joints into a first configuration that exposes the first and second portions of the first interface and into a second configuration that exposes the first and second portions of the second interface, such that the third module covers the first portion of the second interface in the first configuration and covers the first portion of the first interface in the second configuration.

20. The interface of claim 19, wherein the first folding joint is located on a first side of the third module and the second folding joint is located on a second side of the third module opposite to the first side.

21. The interface of claim 19, wherein the first configuration and the second configuration have approximately the same footprint.

22. The interface of claim 19, further comprising:
a latching system adapted to hold the second and third modules together while the first module is rotating around the first folding joint and to hold the first and third modules together while the second module is rotating around the second folding joint.

23. The interface of claim 19, wherein the first surface includes a first concave region and the third surface includes a first convex region adapted to nest within the first concave region in the second configuration.

24. The interface of claim 23, wherein the second surface includes a second concave region and the fourth surface includes a second convex region adapted to nest within the second concave region in the first configuration.

25. The interface of claim 19, wherein the first surface includes a first common interface portion, the second surface includes a second common interface portion, and the third module is smaller than the first and second modules, such that the first and second common interface portions are exposed in the first and second configurations.

26. The interface of claim 19, further comprising:
the first module including a fifth surface including a first portion of a third interface; and
the second module including a sixth surface including a second portion of the third interface;

wherein the first, second, and third modules can be folded along the first and second folding joints into a third configuration that exposes the third interface and hides the first and second interfaces.

27. The interface of claim 26, wherein the third and fourth surfaces of the third module are covered by the first and second modules in the third configuration.

28. The interface of claim 19, wherein:
the first folding joint and the second folding joint are located within a first plane;
the first module includes a fifth surface opposite to the first surface, wherein the fifth surface is parallel to the first plane when the interface is folded into the first configuration and into the second configuration; and
the second module includes a sixth surface opposite to the second surface, wherein the sixth surface is parallel to the first plane when the interface is folded into the first configuration and into the second configuration.

29. The interface of claim 19, wherein:
the third module covers the first portion of the second interface in the first configuration by positioning the second surface of the second module in direct contact with the fourth surface of the third module; and
the third module covers the first portion of the first interface in the second configuration by positioning the first surface of the first module in direct contact with the third surface of the third module.

* * * * *